US012042839B2

(12) United States Patent
Oboodi et al.

(10) Patent No.: US 12,042,839 B2
(45) Date of Patent: Jul. 23, 2024

(54) METHODS AND ARTICLES RELATING TO IONIC LIQUID BATH PLATING OF ALUMINUM-CONTAINING LAYERS UTILIZING SHAPED CONSUMABLE ALUMINUM ANODES

(71) Applicant: HONEYWELL INTERNATIONAL INC., Morris Plains, NJ (US)

(72) Inventors: Reza Oboodi, Morris Plains, NJ (US); James Piascik, Randolph, NJ (US); Lee Poandl, Middlesex, NJ (US); Harry Lester Kington, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1066 days.

(21) Appl. No.: 16/529,722

(22) Filed: Aug. 1, 2019

(65) Prior Publication Data

US 2019/0353041 A1 Nov. 21, 2019

Related U.S. Application Data

(62) Division of application No. 15/139,033, filed on Apr. 26, 2016, now Pat. No. 10,392,948.

(51) Int. Cl.
*B21D 28/00* (2006.01)
*B21D 22/04* (2006.01)
(Continued)

(52) U.S. Cl.
CPC ............. *B21D 28/00* (2013.01); *B21D 22/04* (2013.01); *B21D 28/24* (2013.01); *C25D 3/665* (2013.01);
(Continued)

(58) Field of Classification Search
CPC ........ B21D 22/04; B21D 22/26; B21D 28/00; B21D 28/24; B21D 35/003; B21J 5/08;
(Continued)

(56) References Cited

U.S. PATENT DOCUMENTS 6,254,756 B1 7/2001 Maricocchi et al.
6,322,684 B1 11/2001 Hodko et al.
(Continued)

FOREIGN PATENT DOCUMENTS

CN 101914792 7/2012
CN 102337570 9/2013
(Continued)

OTHER PUBLICATIONS

Abbott, A.P. et al; Physical Chemistry Chemical Physics; High Quality Research in Physical Chemistry, Chemical Physics and Biophysical Chemistry; Issue 37, 2006.
(Continued)

*Primary Examiner* — Debra M Sullivan
*Assistant Examiner* — Matthew Stephens
(74) *Attorney, Agent, or Firm* — Lorenz & Kopf LLP

(57) ABSTRACT

Ionic liquid bath plating methods for depositing aluminum-containing layers utilizing shaped consumable aluminum anodes are provided, as are turbomachine components having three dimensionally-tailored, aluminum-containing coatings produced from such aluminum-containing layers. In one embodiment, the ionic liquid bath plating method includes the step or process of obtaining a consumable aluminum anode including a workpiece-facing anode surface substantially conforming with the geometry of the non-planar workpiece surface. The workpiece-facing anode surface and the non-planar workpiece surface are positioned in an adjacent, non-contacting relationship, while the workpiece and the consumable aluminum anode are submerged in
(Continued)

an ionic liquid aluminum plating bath. An electrical potential is then applied across the consumable aluminum anode and the workpiece to deposit an aluminum-containing layer onto the non-planar workpiece surface. In certain implementations, additional steps are then performed to convert or incorporate the aluminum-containing layer into a high temperature aluminum-containing coating, such as an aluminide coating.

8 Claims, 6 Drawing Sheets

(51) Int. Cl.

| | |
|---|---|
| ***B21D 28/24*** | (2006.01) |
| ***C25D 3/66*** | (2006.01) |
| ***C25D 7/00*** | (2006.01) |
| ***C25D 17/10*** | (2006.01) |
| ***C25D 17/12*** | (2006.01) |
| ***F01D 5/28*** | (2006.01) |
| ***F01D 5/30*** | (2006.01) |

(52) U.S. Cl.
CPC ............... *C25D 7/00* (2013.01); *C25D 17/10* (2013.01); *C25D 17/12* (2013.01); *F01D 5/288* (2013.01); *F01D 5/3092* (2013.01); *F05D 2230/31* (2013.01); *F05D 2230/90* (2013.01); *F05D 2300/121* (2013.01)

(58) Field of Classification Search
CPC ........... F23R 2900/00018; F01D 5/288; F05D 2230/90
See application file for complete search history.

(56) References Cited

U.S. PATENT DOCUMENTS

| | | | | | |
|---|---|---|---|---|---|
| 8,581,401 | B2 | 11/2013 | Lu et al. | | |
| 8,778,163 | B2 | 7/2014 | Yu et al. | | |
| 8,778,164 | B2 | 7/2014 | Piascik et al. | | |
| 9,105,905 | B2 | 8/2015 | Ramasubramanian et al. | | |
| 2003/0230491 | A1 | 12/2003 | Basol et al. | | |
| 2004/0248405 | A1 | 12/2004 | Fukunaga et al. | | |
| 2005/0053467 | A1 | 3/2005 | Ackerman et al. | | |
| 2005/0241360 | A1* | 11/2005 | Miller | B21D 43/02 | 72/420 |
| 2006/0042933 | A1* | 3/2006 | Evans | C25B 15/00 | 204/242 |
| 2008/0035486 | A1 | 2/2008 | Albrecht et al. | | |
| 2008/0302667 | A1 | 12/2008 | Rucker et al. | | |
| 2010/0072073 | A1 | 3/2010 | Jabado et al. | | |
| 2012/0156519 | A1 | 6/2012 | Piascik et al. | | |
| 2014/0272458 | A1 | 9/2014 | Ruan et al. | | |
| 2014/0329132 | A1 | 11/2014 | Lahiri et al. | | |
| 2015/0062782 | A1 | 3/2015 | Rzany et al. | | |
| 2015/0144495 | A1 | 5/2015 | Chen et al. | | |
| 2015/0200390 | A1 | 7/2015 | Lu et al. | | |
| 2015/0299884 | A1 | 10/2015 | Chen et al. | | |
| 2015/0376810 | A1 | 12/2015 | Browning et al. | | |
| 2016/0024637 | A1* | 1/2016 | Nakano | C23C 10/04 | 123/193.6 |
| 2016/0208813 | A1* | 7/2016 | Zafiris | F04D 29/324 | 204/242 |
| 2016/0312614 | A1 | 10/2016 | Chen et al. | | |
| 2019/0003070 | A1* | 1/2019 | Piascik | C25D 7/00 | 204/242 |
| 2019/0024605 | A1* | 1/2019 | Iizuka | F16J 1/01 | 123/193.6 |

FOREIGN PATENT DOCUMENTS

| | | | | | |
|---|---|---|---|---|---|
| CN | 104294327 | | | 1/2015 | |
| CN | 102839403 | | | 2/2015 | |
| CN | 102766891 | B | | 3/2015 | |
| CN | 103436921 | | | 8/2015 | |
| CN | 106925670 | A | * | 7/2017 | B21D 28/14 |
| DE | 102016124971 | A1 | * | 6/2018 | B21D 22/02 |
| DE | 102018107413 | A1 | * | 10/2019 | B21D 11/08 |
| JP | 2012122445 | A | * | 6/2012 | F02F 3/10 |
| WO | 2014150508 | A1 | | 9/2014 | |

OTHER PUBLICATIONS

Abbott, A.P. et al; Material Research; Electroplating Using Ionic Liquids; Annual Review of Materials Research vol. 43: 335-358 (Volume publication date Jul. 2013).

Huang P. et al; A review of ionic liquid surface film formation on Mg and its alloys for improved corrosion performance; Electrochimica Acta; © 2013 Elsevier Ltd.

Liu, Q.X. et al; Electroplating of mild steel by aluminium in a first generation ionic liquid: A green alternative to commercial Al-plating in organic solvents; ScienceDirect Surface & Coatings Technology 201 (2006) 1352-1356.

* cited by examiner

METHODS AND ARTICLES RELATING TO IONIC LIQUID BATH PLATING OF ALUMINUM-CONTAINING LAYERS UTILIZING SHAPED CONSUMABLE ALUMINUM ANODES

CROSS-REFERENCE TO RELATED APPLICATION

This application is a divisional application of U.S. patent application Ser. No. 15/139,033, filed Apr. 26, 2016.

TECHNICAL FIELD

The present invention relates generally to electroplating and, more particularly, ionic liquid bath plating methods for depositing aluminum-containing layers utilizing shaped consumable aluminum anodes, as well as to turbomachine components having three dimensionally-tailored, aluminum-containing coatings produced from aluminum-containing layers.

BACKGROUND

Aluminum-containing coatings are produced over rotor blades, nozzle vanes, combustor parts, and other turbomachine components for protection from rapid degradation within the high temperature, chemically-harsh turbomachine environment. Aluminide coatings, for example, are often formed over turbomachine components to minimize material loss resulting from oxidation and corrosion. To produce an aluminide (or other aluminum-containing) coating, at least one aluminum-containing layer is deposited onto the surfaces of the turbomachine component over which the aluminide coating is desirably formed. The aluminum-containing layer may be composed of relatively pure aluminum or may instead contain other constituents, such as chromium or platinum, co-deposited with aluminum. In conjunction with or after deposition of the aluminum-containing layer, a diffusion process is carried-out to form aluminides with the superalloy material of the turbomachine component. Over the operational lifespan of the turbomachine component, the aluminide coating gradually recedes or wears away; however, the recession rate of the aluminide coating is significantly less than the rate at which the underlying turbomachine component would otherwise oxidize, corrode, and recede if left uncoated. Thus, through the formation of such a high temperature aluminide coating, the operational lifespan of the turbomachine component can be extended.

Conventional processes for depositing aluminum-containing layers over turbomachine components include pack cementation and Chemical Vapor Deposition (CVD). Such deposition processes are associated with a number of drawbacks, which may include undesirably high processing costs, cumbersome high temperature masking requirements, and the general inability to deposit aluminum-containing layers over non-planar, geometrically-complex surfaces in a predictable and controlled manner. Recently, ionic liquid bath plating processes have been introduced, which provide a relatively low cost approach for depositing aluminum-containing layers onto metallic workpieces. As a further advantage, ionic liquid bath plating processes are carried-out under low temperature conditions at which high temperature masking is unneeded. While such advantages are significant, ionic liquid bath plating processes remain limited in certain respects. For example, as conventionally performed, ionic liquid bath plating processes are typically incapable of depositing an aluminum-containing layer over the non-planar surfaces of a metallic workpiece, such as the aerodynamically-streamed surfaces of a turbomachine component, in a consistent and controlled manner without the usage of relatively complex plating set-ups; e.g., plating set-ups including relatively large anode pin arrays, auxiliary anodes, multiple power sources, and the like.

It is thus desirable to provide ionic liquid bath plating process enabling the deposition of aluminum-containing layers over contoured workpiece surfaces, such as the aerodynamically-streamlined surfaces of turbomachine components, in a controlled and cost-effective effective manner. For reasons explained more fully below, it would also be desirable to provide ionic liquid bath plating processes enabling the deposition of aluminum-containing layers having three dimensionally-tailored thickness distributions. Finally, it would be desirable to provide embodiments of turbomachine components having three dimensionally-tailored, aluminum-containing coatings produced, at least in part, from aluminum-containing layers. Other desirable features and characteristics of embodiments of the present invention will become apparent from the subsequent Detailed Description and the appended Claims, taken in conjunction with the accompanying drawings and the foregoing Background.

BRIEF SUMMARY

Ionic liquid bath plating methods are provided for depositing aluminum-containing layers onto a metallic workpiece having one or more non-planar workpiece surfaces. In embodiments, the ionic liquid bath plating method includes the step or process of obtaining a consumable aluminum anode including a workpiece-facing anode surface substantially conforming with the geometry of the non-planar workpiece surface. The workpiece-facing anode surface and the non-planar workpiece surface are positioned in an adjacent, non-contacting relationship, while the workpiece and the consumable aluminum anode are submerged in an ionic liquid aluminum plating bath. An electrical potential is applied across the consumable aluminum anode and the workpiece to deposit an aluminum-containing layer onto the non-planar workpiece surface. The aluminum-containing layer deposited onto the non-planar workpiece surface may consist essentially of aluminum or may instead contain other constituents co-deposited with aluminum. In certain implementations, additional steps are then performed to convert or incorporate the aluminum-containing layer into a high temperature aluminum-containing coating, such as an aluminide coating. In one embodiment, the consumable aluminum anode is selected to have an anode body that is shaped, at least in part, to substantially conform with a non-planar geometry of the non-planar workpiece surface. The shaped anode body may be produced from, for example, a stamped aluminum sheet.

In other embodiments, the ionic liquid bath plating method includes the step or process of identifying a workpiece having a workpiece surface over which an aluminum-containing layer having an average thickness ($T_{AVG}$) is subsequently deposited. A virtual thickness map for the aluminum-containing layer is established and includes at least one thickness-modified region ($T_{MOD}$), which has a thickness different than $T_{AVG}$ and which overlies a targeted region of the workpiece surface. A consumable aluminum anode is obtained having an anode body and at least one anodic field modifying feature. The consumable aluminum anode and the metallic workpiece are placed in a neighboring, non-contacting relationship such that the at least one anodic field modifying feature is positioned adjacent the targeted region of the workpiece surface. The consumable aluminum anode and the metallic workpiece are partially or fully submerged in an ionic liquid aluminum plating bath. An electrical potential is applied across the consumable aluminum anode and the metallic workpiece to deposit the aluminum-containing layer onto the workpiece surface including the thickness-modified region overlying the targeted region of the workpiece surface.

Embodiments of a turbomachine component are further provided. In one embodiment, the turbomachine component includes a contoured surface having a region prone to recession (e.g., due to the occurrence of oxidation and corrosion) when the component is placed within a high temperature turbomachine environment. A high temperature, aluminum-containing coating (e.g., an aluminide coating) is formed over the contoured surface and includes a locally-thickened region overlying the recession-prone region. The locally-thickened region is at least partially composed of or formed from an aluminum-containing layer deposited onto the contoured surface utilizing, for example, an ionic liquid bath plating process. In certain implementations, the turbomachine component may include a rotor blade, which has a blade tip portion, a blade root portion, and a leading edge portion extending between the blade tip portion to the blade root portion. In such implementations, the locally-thickened region of the aluminum-containing coating may overlie or cover the blade tip portion and the leading edge portion of the turbomachine component, at least in substantial part. In another embodiment, the aluminum-containing coating further includes a locally-thinned region at least partially overlying of the blade root portion of the turbomachine component.

Methods for fabricating shaped consumable aluminum anodes are further provided. In embodiments, the method includes the step or process of purchasing, fabricating, or otherwise obtaining a die having a plurality of die cavities. Each die cavity has a contoured or shaped geometry, which is substantially conformal with a contoured surface of a metallic workpiece over which an aluminum-containing layer is desirably deposited. The aluminum sheet is then pressed into the die to transfer the contoured geometry of the die cavities and produce non-singulated shaped anodes across the aluminum sheet. The shaped anodes are then separated by singulation of the aluminum sheet. In certain embodiments, local anodic field modifying features may also be formed (e.g., by stamping or utilizing a material removal process, such as photoetching) at selected locations across the aluminum sheet prior to singulation of the aluminum sheet.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
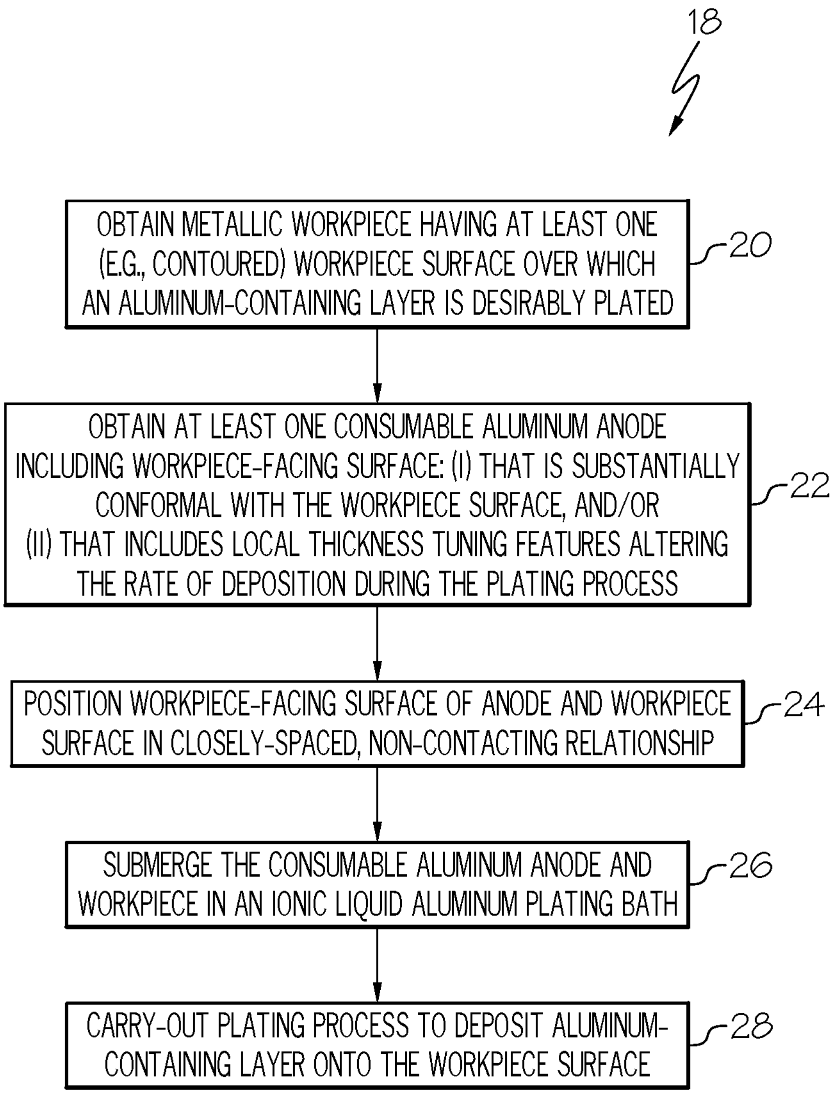
FIG. 1 is a flowchart setting-forth an ionic liquid bath plating method for depositing an aluminum-containing layer onto one or more surfaces of a metallic workpiece, as illustrated in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following Detailed Description. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

Ionic liquid bath plating methods are provided for depositing aluminum-containing layers onto the non-planar surfaces of a metallic workpiece. The ionic liquid bath plating methods are carried-out utilizing consumable aluminum anodes, which are shaped to generally conform with the geometry or contour of the non-planar workpiece surfaces. Through the usage of such shaped, consumable aluminum anodes, an aluminum-containing layer can be deposited over non-planar workpiece surfaces in a predictable and highly controlled manner, while still utilizing an ionic liquid bath plating approach. The consumable aluminum anodes need not precisely conform with the geometry of the non-planar workpiece surfaces in all implementations. Indeed, in certain embodiments, it may be desirable to produce a consumable aluminum anode (and, specifically, the workpiece-facing surface or surfaces of the anode) to have a geometry that emulates, but does not precisely follow the geometry of the non-planar workpiece surface to provide variable gap width between the workpiece-facing anode surface and the non-planar workpiece surface. Such a variable gap width alters the deposition rate during the plating process and, therefore, the final thickness distribution of the aluminum-containing layer. Thus, when it is desired to impart the aluminum-containing layer with a tailored thickness distribution, the consumable aluminum anodes can be shaped as a function of the surface geometry of the non-planar workpiece surface and the desired thickness distribution of the aluminum-containing layer to be deposited over the workpiece surface.

When the aluminum-containing layer is desirably imparted with a tailored thickness profile or distribution, the consumable aluminum anodes may also include local anodic field modifying features. As appearing herein, the term "local anodic field modifying features" refers to structural features or elements of the anode that alter (e.g., amplify or dampen) particular areas or zones of the anodic field during the plating process to control the final layer thickness distribution. In this regard, the consumable aluminum anodes may include raised features (e.g., raised dimples or ridges stamped into the anode bodies) that amplify the anodic field adjacent areas of the workpiece surface over which it is desired to increase the local thickness of the aluminum-containing layer. Conversely, the consumable aluminum anodes may include depressions or openings (e.g., an array of perforations formed through anode bodies) that dampen the anodic field adjacent areas of the workpiece surface over which it is desired to decrease the local thickness of the aluminum-containing layer. Additional examples of local anodic field modifying features are provided below. The foregoing notwithstanding, the consumable aluminum anodes need not include anodic field modifying features in all embodiments. For example, the consumable aluminum anodes may lack anodic field modifying features in implementations wherein the aluminum-containing layer is desirably deposited to have a substantially uniform layer thickness or when any desired variations in layer thickness are effectuated by shaping the aluminum anodes to provide a varied gap width between the workpiece surface and the workpiece-facing anode surfaces, as described below.

The ionic liquid bath plating method can be carried-out to deposit aluminum-containing layers onto any type of metallic workpiece, regardless of surface geometry or the application in which the workpiece is ultimately utilized. Embodiments of the ionic liquid bath plating method may, however, be particularly useful in depositing aluminum-containing layers onto turbomachine components for at least two reasons. First, turbomachine components often have highly contoured, aerodynamically-streamlined surfaces, which can be difficult to plate in a consistent and controlled manner utilizing conventional plating processes. Second, the ability to deposit an aluminum-containing layer having a tailored thickness distribution is useful in the context of turbomachine components having gas-exposed surfaces over which aluminum-containing (e.g., aluminide) coatings are desirably formed. When deposited to have such a tailored thickness distribution, the aluminum-containing layer can be converted to or integrated into an aluminum-containing coating having a similar three dimensionally-tailored thickness distribution. The aluminum-containing coating can thus be imparted with a regionally-varied thickness distribution optimized or tailored in accordance with the operating conditions (e.g., in-service temperatures), material loss characteristics (e.g., oxidation, hot gas corrosion, and other degradation rates), and failure modes encountered within the service environment of the turbomachine component. This, in turn, may prolong the operational lifespan of the coated turbomachine component.

FIG. 1 is a flowchart setting-forth an exemplary method 18 for ionic liquid bath plating one or more aluminum-containing layers onto selected surfaces of a metallic workpiece, as illustrated in accordance with an exemplary embodiment of the present invention. Ionic liquid bath plating method 18 includes a number of sequentially-performed process steps (STEPS 20, 22, 24, 26, and 28). Depending upon the particular manner in which method 18 is implemented, each step generically illustrated in FIG. 1 may entail a single process or multiple sub-processes. The steps illustrated in FIG. 1 and described below are provided by way of non-limiting example only. In alternative embodiments of ionic liquid bath plating method 18, additional process steps may be performed, certain steps may be omitted, and/or the illustrated steps may be performed in alternative sequences.

Figure 2:
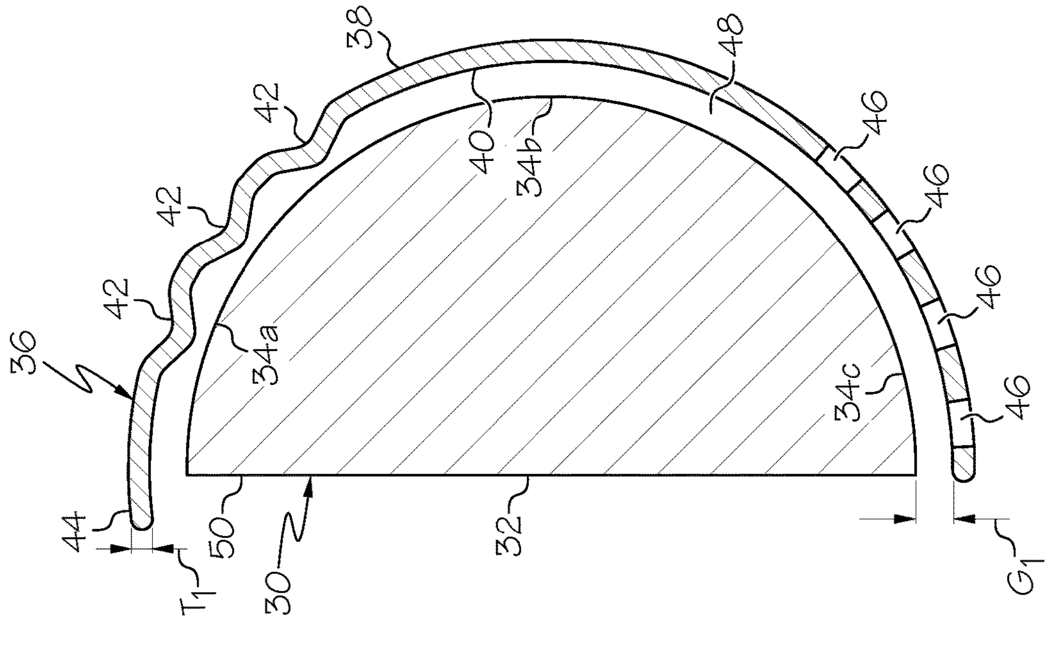

Ionic liquid bath plating method 18 commences with producing, purchasing, or otherwise obtaining a metallic workpiece onto which an aluminum-containing layer is desirably plated (STEP 20, FIG. 1). The metallic workpiece can be any article of manufacture, item, or component over which an aluminum-containing layer is desirably plated. Ionic liquid bath plating method 18 is particularly well-suited for depositing aluminum-containing layer onto geometrically-complex, non-planar workpiece surfaces, including highly contoured surfaces that bend or curve in multiple dimensions in three dimensional space. FIG. 2 is a cross-sectional view of a metallic workpiece 30, which can obtained during STEP 20 of ionic liquid bath plating method 18 (FIG. 1). Metallic workpiece 30 is provided by way of example only and is illustrated in a simplified form to emphasize that plating method 18 can be utilized to deposit aluminum-containing layers over a wide variety of metallic workpieces. As can be seen, workpiece 30 has a semi-cylindrical cross-sectional geometry, which is bound by a planar workpiece surface 32 and a contoured (e.g., convex) workpiece surface 34. For the purpose of the following description, contoured workpiece surface 34 is conceptually divided into three general regions: an upper surface region 34(*a*), an intermediate surface region 34(*b*), and a lower surface region 34(*c*). As described below, plating method 18 can be utilized to deposit an aluminum-containing layer over workpiece surface 34, with the aluminum-containing layer having a different desired thickness over each surface region 34(*a*)-(*c*).

Referring collectively to FIGS. 1-2, ionic liquid bath plating method 18 next advances to STEP 22 (FIG. 1) during which one or more consumable aluminum anodes are obtained. In relatively simple implementations of ionic liquid bath plating method 18, a single consumable aluminum anode may be obtained during STEP 22, such as consumable aluminum anode 36 shown in FIG. 2 and described more fully below. In other, more complex implementations of plating method 18, multiple consumable aluminum anodes can be obtained during STEP 22 and strategically positioned adjacent or around a workpiece to plate aluminum-containing layers onto multiple workpiece surfaces or workpiece surfaces having relatively complex topologies. As was the case with the metallic workpiece, the consumable aluminum anodes can be obtained by independent production (that is, the anodes can be fabricated by the same entity that performs the remainder of plating method 18), by purchase from a third party supplier, or in another manner.

The consumable aluminum anode or anodes obtained during STEP 22 of method 18 (FIG. 1) can include one or more non-planar anode surfaces, which have surface geometries substantially matching or conforming with the non-planar workpiece surface or surfaces to be plated. Thus, if a particular workpiece surface targeted for plating has a contoured or curved surface geometry, the non-planar anode surface may likewise have a contoured or curved geometry that is substantially conformal with the workpiece surface. As appearing herein, the term "substantially conformal" does not require that a particular consumable aluminum anode strictly adhere or precisely duplicate the geometry of the workpiece surface targeted for plating. Instead, in certain embodiments, a consumable aluminum anode will generally mimic or approximate the general surface geometry of the workpiece surface and may not, for example, follow any highly refined or localized features (e.g., small bumps or recesses) present along the workpiece surface. Additionally, the three dimensional geometry of the consumable aluminum anode(s) allows the provision of a varied gap width between the anode(s) and the workpiece surface when placed in an adjacent, non-contacting relationship during the electroplating process. Thus, such a varied gap width created can also be utilized to tune or "shape" the anodic field generated when the consumable aluminum anode and workpiece are energized to further control the plating thickness of the aluminum-containing layer in the manner described below.

In certain implementations, the consumable aluminum anodes obtained during STEP 22 of plating method 18 (FIG. 1) may also include local anodic field modifying features that tune or shape the anodic field generated when the anodes are energized. Such local anodic field modifying features thus alter the rate of deposition during the electroplating process and, therefore, the final thickness distribution of the deposited aluminum-containing layer. The consumable aluminum anodes may include anodic field focusing features that concentrate areas of the anodic field to accelerate the local plating rate relative to the average electroplating deposition rate during the electroplating process. Additionally or alternatively, the consumable aluminum anodes may include that anodic field damping features, which suppress regions of the anodic field to decelerate the local plating rate or to substantially prevent local plating during electroplating. By appropriately dimensioning and positioning such local anodic field modifying features across the anode bodies, the aluminum-containing layer or layers can be deposited to have a highly controlled, three dimensionally tailored thickness distribution. The appropriate dimensioning and positioning of the local anodic field modifying features for a given iteration of plating method 18 (FIG. 1) can be determined by first establishing a virtual thickness distribution plot or map may be first established The virtual thickness distribution plot defines a desired thickness distribution for the aluminum-containing layer or layers to be deposited onto the selected workpiece. Modeling software may then be utilized to determine the appropriate positioning, dimensions, and geometries of the anodic field modifying features to achieve the thickness distribution as a function of the virtual thickness distribution map and the surface geometry of the workpiece to be plated.

Referring once again to FIG. 2, there is shown an exemplary shaped consumable aluminum anode 36 that may be utilized in the plating of metallic workpiece 30. In this particular example, consumable aluminum anode 36 includes an anode body 38 having a workpiece-facing anode surface 40. Anode body 38 and, specifically, workpiece-facing anode surface 40 has a geometry and dimensions that are substantially conformal with the geometry and dimensions of workpiece surface 34. Thus, in the illustrated example wherein contoured workpiece surface 34 has a convex geometry, workpiece-facing anode surface 40 is imparted with a concave geometry following the convex geometry of surface 34. Workpiece-facing anode surface 40 can be imparted with such a three dimensional geometry by shaping anode body 38, in whole or in part. Consumable aluminum anode 36 can be produced utilizing a different manufacturing technique, such as three dimensional metal printing, Direct Metal Laser Sintering (DMLS), or another additive manufacturing approach. In one embodiment, and by way of non-limiting example only, anode body 38 is produced from a relatively thin aluminum plate or sheet, which is formed into (e.g., by stamping) a three dimensional shape following the geometry of workpiece surface 34.

As shown in FIG. 2, consumable aluminum anode 36 includes the following anodic field modifying features: (i) a number of raised features 42, (ii) an extended anode portion 44, and (iii) an array of perforations or openings 46. Raised features 42 may be localized dimples or ridges formed in anode body 38 by, for example, stamping or die forming of an aluminum sheet from which anode body 38 is produced. Features 42 are "raised" in the sense that, when consumable aluminum anode 36 is properly positioned adjacent metallic workpiece 30, features 42 project from anode body 38 toward contoured workpiece surface 34. Features 42 project into the standoff or gap (identified by reference number "48" in FIG. 2) provided between workpiece-facing anode surface 40 and contoured workpiece surface 34 when anode 36 and workpiece 30 are placed in a neighboring, non-contacting relationship. When consumable aluminum anode 36 and metallic workpiece 30 are energized, raised features 42 concentrate the anodic field generated along the region of contoured workpiece surface 34 (i.e., upper surface region 34(*a*)) positioned adjacent features 42). Raised features 42 thus function as anodic field focusing features during the electroplating process. Extended anode portion 44 also serves as an anodic field focusing feature, which concentrates the anodic field along an edge region 50 of workpiece 30 beyond which anode portion 44 extends or projects to accelerate the local plating rate during electroplating. Thus, raised features 42 and extended anode portion 44 collectively promote the deposition of a locally-thickened region of the aluminum-containing layer over upper surface region 34(*a*) of workpiece 30.

In contrast to raised features 42 and extended anode portion 44, openings 46 serve as anodic field damping features. Specifically, openings 46 decrease the metal density of consumable aluminum anode 36 and, therefore, anodic field along the region of contoured workpiece surface 34 positioned adjacent openings 46 (i.e., lower surface region 34(*c*)). When viewed in three dimensions, openings 46 may have any suitable dimensions and planform geometries, such as have rounded or elongated, slot-like shapes. In one embodiments, openings 46 are generally rounded and an array of spaced openings or perforations is provided through the lower portion of consumable aluminum anode 36. By controlling the size, relative positioning, and density of such openings or perforations, a precisely controlled anodic field can be generated during the plating process to assist in the deposition of aluminum-containing layer having a tailored, regionally-varied thickness distribution. As an additional benefit, openings 46 may also facilitate flow of the plating bath through consumable aluminum anode 36 during the plating process, as indicated by double-headed arrows in below-described FIG. 3. Openings 46 can be formed through anode body 38 by photo-etching, water jetting, laser cutting, wire Electro Discharge Machining (EDM), stamping, punching, or utilizing another material removal process.

In the exemplary embodiment shown in FIG. 2, anode body 38 of consumable aluminum anode 36 has an average thickness (Ti). The thickness of anode 36 may be substantially uniform or constant across anode body 38 when consumable aluminum anode 36 is produced by stamping or die-forming an aluminum sheet or plate. The value of the anode thickness Ti will vary amongst embodiments. Generally, when consumable aluminum anode 36 is produced from a stamped or die-formed aluminum sheet, forming processes are eased as anode thickness decreases. However, consumable aluminum anode 36 is soluble and dissolves during the below-described electroplating process. Thus, the geometry of consumable aluminum anode 36 will gradually change during plating and anode 36 will require periodic replacement as multiple cycles of the plating process are performed. The useful lifespan of consumable aluminum anode 36 can consequently be prolonged by increasing the anode thickness Ti. To satisfy these competing criteria, the average anode thickness may range from about 0.075 to about 0.175 inch (1.91 and 4.44 millimeters) in an embodiment. In other embodiments, such as embodiments wherein consumable aluminum anode 36 is produced utilizing a non-stamping process (e.g., casting, three dimensional printing, or machining of an aluminum block), the average anode thickness may be greater than or less than the aforementioned range and/or the anode thickness may vary across anode body 38.

Figure 3:
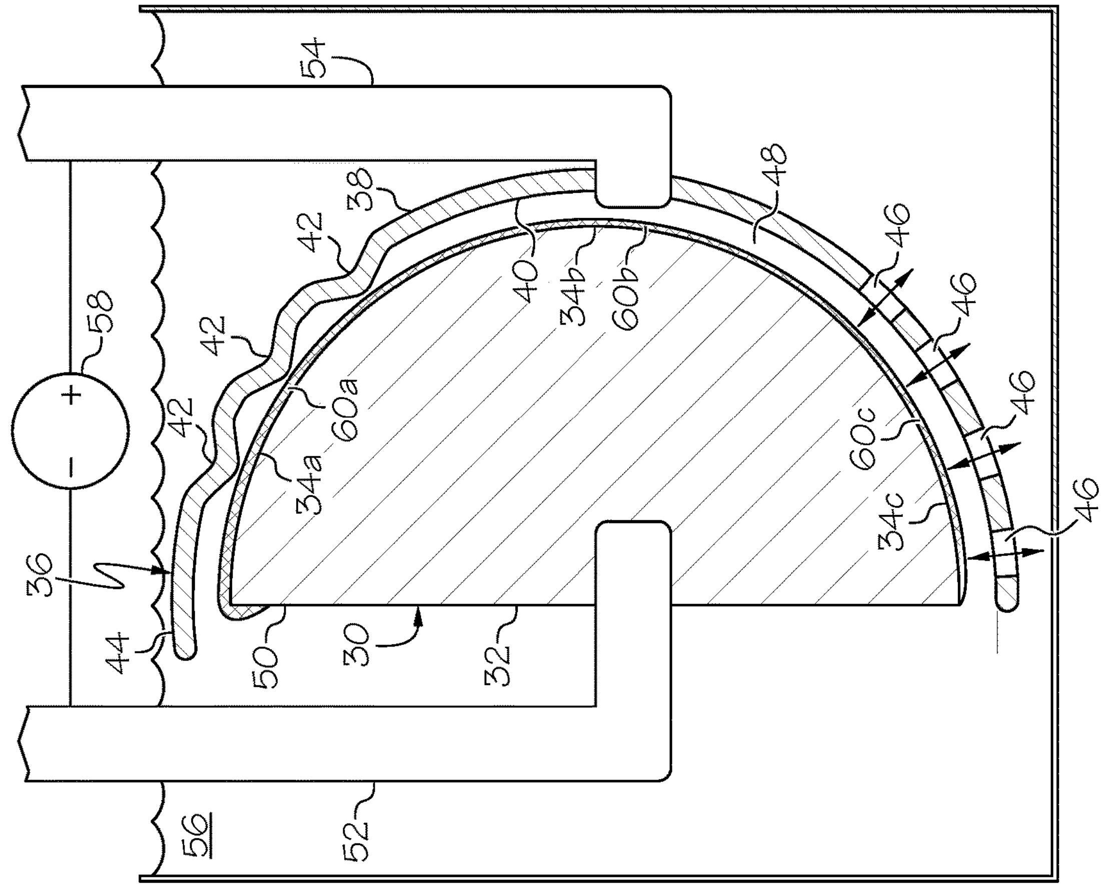
FIGS. 2 and 3 are cross-sectional views of a consumable aluminum anode positioned adjacent the contoured surface of a metallic workpiece, as illustrated before and after deposition of an aluminum-containing layer onto the workpiece surface in accordance with the ionic liquid bath plating method of FIG. 1.

Continuing with plating method 18, the consumable aluminum anode or anodes are next positioned adjacent to the contoured workpiece surfaces over which the aluminum-containing layer is desirably applied (STEP 24, FIG. 1). The consumable aluminum anodes are placed in a non-contacting relationship with the workpiece such that the non-planar, workpiece-facing anode surface or surfaces are spaced apart from the contoured workpiece surface or surfaces over which the aluminum-containing layers are desirably plated. Referring now to FIG. 3 in conjunction with FIGS. 1 and 2, consumable aluminum anode 36 is positioned adjacent metallic workpiece 30, while remaining separated therefrom by a lateral offset or gap 48. Consumable aluminum anode 36 and metallic workpiece 30 may be maintained in this neighboring, non-contacting relationship utilizing a specialized fixture, such as fixture 52, 54 generically shown in FIG. 3. The average width of gap 48 (identified as "Gi" in FIG. 2) will vary amongst embodiments depending process parameters and other factors, but will typically be relatively small. In one embodiment, the average gap width Gi may be between about 0.050 and 0.300 inch (about 1.27 to about 7.62 millimeters). In other embodiments, the average gap width Gi may be greater than or less than the aforementioned range. Additionally, as noted above, the gap width Gi may be held substantially constant across the interface between aluminum anode 36 and workpiece 30 or may instead vary within limits due to geometric disparities between anode surface 40 and workpiece surface 34.

At STEP 26 of plating method 18 (FIG. 1), the consumable aluminum anode(s) and the metallic workpiece are at least partially submerged in an ionic liquid aluminum plating bath, such as ionic liquid plating bath 56 shown in FIG. 3. The particular formation of the aluminum plating bath will vary amongst embodiments, but will typically contain aluminum, at least one molten salt, and possibly other additives. A common ionic liquid utilized in aluminum plating processes is 1-Ethyl-3-methylimidazolium chloride or [EMIM] Cl. Additionally, aluminum chloride ($AlCl_3$) can be introduced to the bath as a source of aluminum ions. In other embodiments, the ionic liquid aluminum plating bath may be formulated as a slurry in which particles of aluminum are suspended. If desired, other metal or non-metal additives (e.g., reactive elements) for co-deposition with aluminum can also be contained within the aluminum bath as, for example, soluble chlorides. Various other additives may further be introduced into the ionic liquid aluminum plating bath for surface modification and other purposes.

Lastly, ionic liquid bath plating method 18 (FIG. 1) advances to STEP 28 during which electroplating is carried-out. During STEP 28, an electrical potential is applied across the consumable aluminum anode or anodes and the metallic workpiece. Process parameters (e.g., current density, duration, bath temperature, and agitation level) are controlled to deposit the aluminum-containing layer onto the targeted surfaces of the metallic workpiece. As indicated above, ionic liquid bath plating can be performed at relatively low temperatures (e.g., room temperature) to avoid undesired diffusion of aluminum into the metallic workpiece without masking. Additionally, multiple workpieces can be plated in parallel to further increase process efficiency. The electroplating process is carried-out for a predetermined duration of time and/or until the aluminum-containing layer is deposited to its desired thickness or thicknesses. The aluminum-containing layer deposited during STEP 28 of method 18 (FIG. 1) can have any composition containing aluminum in non-trace amounts. In certain embodiments, the aluminum-containing layer may consist essentially of relatively pure aluminum. In other embodiments, the aluminum-containing layer may contain any number of other metallic or non-metallic constituents co-deposited with aluminum. Such other constituents may include chromium, hafnium, lanthanum, platinum, and zirconium, to list but a few examples. The metallic workpiece is removed from the ionic liquid plating bath after the aluminum-containing layer has been fully deposited, and ionic liquid bath plating method 18 (FIG. 1) concludes.

Referring once again to FIG. 3, metallic workpiece 30 and consumable aluminum anode 36 are illustrated after electroplating and prior to removal from plating bath 56. At this juncture of the electroplating process, the negative terminal of a voltage source 58 remains electrically coupled to metallic workpiece 30, while the positive terminal of voltage source 58 is electrically coupled to consumable aluminum anode 36. Voltage source 58 is electrically coupled to metallic workpiece 30 and consumable aluminum anode 36 through fixture 52, 54 in the illustrated example; however, voltage source 58 can be connected directly or indirectly to metallic workpiece 30 and consumable aluminum anode 36 in other manners. With the electroplating process completed, an aluminum-containing layer 60 has been deposited over contoured workpiece surface 34 and may partially extend over planar surface 32. In further embodiments, an additional aluminum-containing layer may likewise be deposited over planar surface 32, if desired, utilizing a second consumable aluminum anode having a surface geometry substantially matching or following the geometry of surface 32.

As identified in FIG. 3, aluminum-containing layer 60 is composed of three general regions: (i) a first layer region 60(*a*) overlying workpiece surface region 34(*a*), (ii) a second layer region 60(*b*) overlying workpiece surface region 34(*b*), and (iii) a third layer region 60(*c*) overlying workpiece surface region 34(*c*). Due to the provision of local anodic field modifying features 42, 44, 46, aluminum-containing layer 60 has been deposited to have a three-dimensionally-tailored thickness distribution. Due to the positioning of anodic field amplifying features 42 and 44, layer region 60(*a*) of aluminum-containing layer 60 has been imparted with an increased thickness relative to layer regions 60(*b*)-(*c*). Conversely, due to the positioning of openings or perforated anode region 46 adjacent workpiece surface region 34(*a*), layer region 60(*c*) has been imparted with a decreased thickness relative to layer regions 60(*a*)-(*b*). Stated differently, aluminum-containing layer 60 has been deposited to includes two thickness-modified layer regions (regions 60(*a*) and 60(*c*)), which each have a disparate thicknesses as compared to the average thickness of layer 60 ($T_{AVG}$). In particular, layer region 60(*a*) has a first modified thickness $T_{MOD1}$ that is greater than $T_{AVG}$, while layer region 60(*c*) has a second modified thickness $T_{MOD2}$ that is less than $T_{AVG}$.

Aluminum-containing layer 60 (FIG. 3) may be deposited in accordance with a pre-established virtual thickness plot or map. The virtual thickness map may be established utilizing modeling software as a function of the geometry of workpiece surface 34 and any desired thickness variations in aluminum-containing layer 60 as deposited over surface 34. In accordance with the example shown in FIG. 3, the virtual thickness map may specify that the aluminum-containing layer should be deposited to include at least one thickness-modified region (regions 60(*a*) and 60(*c*)) having a modified thickness ($T_{MOD}$) that varies as compared to the average thickness of the layer ($T_{AVG}$). A consumable aluminum anode (aluminum anode 36) is then obtained having a number of anodic field modifying features (local anodic field modifying features 42, 44, 46) appropriately size, positioned, and shaped to create the desired thickness variations. The consumable aluminum anode (aluminum anode 36) is then positioned adjacent the metallic workpiece (workpiece 30) such that the anodic field modifying features (features 42, 44, 46) are placed adjacent the targeted regions of the workpiece surface (regions 30(*a*) and 30(*c*)) over which the thickness-modified regions (regions 60(*a*) and 60(*c*)) are desirably plated. An electrical potential is then applied across consumable aluminum anode 36 and workpiece 30, while submerged in bath 56 to produce aluminum-containing layer 60 having thickness-modified regions (regions 60(*a*) and 60(*c*)) overlying the targeted regions of the workpiece surface.

There has thus been desired ionic liquid bath plating process enabling the deposition of aluminum-containing layers over contoured workpiece surfaces. As noted above, the unique abilities of the ionic liquid bath plating method (that is, the ability to deposit an aluminum-containing layer onto geometrically-complex surfaces in a highly controlled manner and/or the ability to deposit the aluminum-containing layer to have a three-dimensionally tailored thickness distribution) may render the plating method particularly useful when performed as part of a high temperature coating fabrication process. In this regard, embodiments of the ionic liquid bath plating method may be utilized to deposit an aluminum-containing layer, which is subsequently converted to or integrated into a high temperature aluminum-containing coating formed over the contoured or streamlined surfaces of turbomachine component. To emphasize this point, a further exemplary implementation of plating method 18 will now be described in conjunction with FIGS. 4-7 during which plating method 18 is utilized to deposit an aluminum-containing layer over a turbomachine component in the course of a high temperature coating fabrication process.

Figure 4:
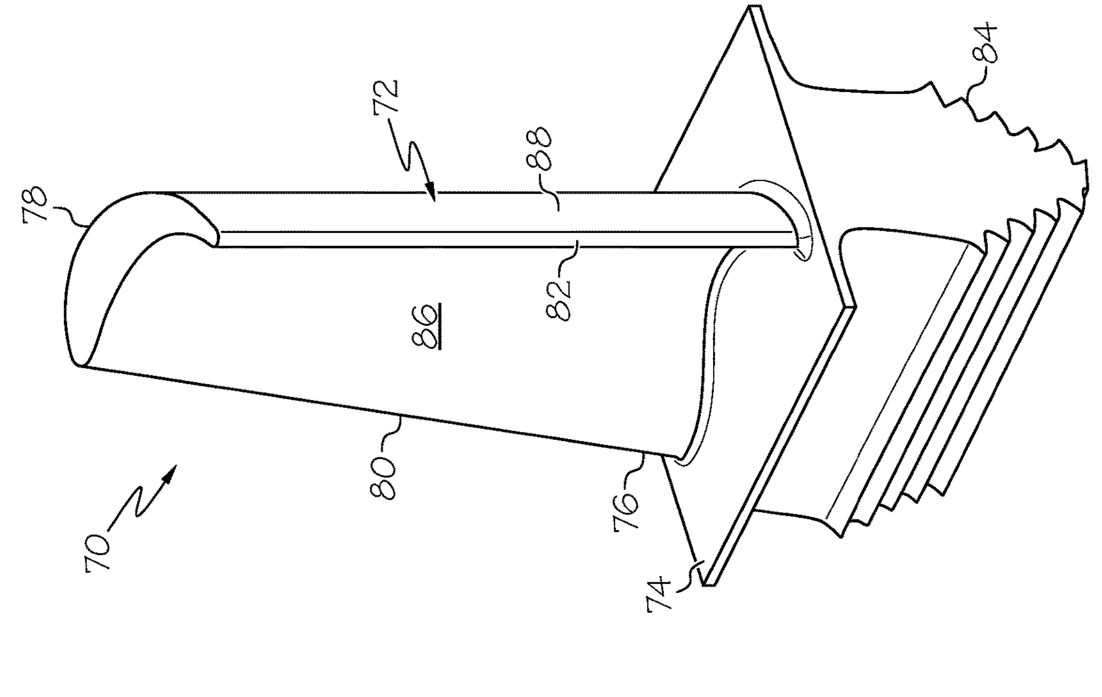
FIG. 4 is an isometric view of a turbomachine component and, specifically, a rotor blade piece including contoured blade surfaces onto which an aluminum-containing layer can be deposited utilizing the plating method of FIG. 1.

FIG. 4 is an isometric view of a turbomachine component 70 over which a high temperature, aluminum-containing coating is desirably produced. In this particular example, turbomachine component 70 is a rotor blade piece and will consequently be referred to as "rotor blade piece 70" hereafter. It will be appreciated, however, that the foregoing description is equally applicable to other types of turbomachine components including vanes, swirlers, heat shields, and other components exposed to high temperature gas flow during operation of the turbomachine. Additionally, while only a single rotor blade piece is shown in FIG. 4, it will be appreciated that any number of additional rotor blade pieces may be plated in conjunction with rotor blade piece 70 utilizing a common ionic plating bath. Furthermore, in alternative embodiments of ionic liquid bath plating method 18 (FIG. 1), the rotor blade pieces can be plated subsequent to incorporation into the larger bladed rotor. In this case, the entire bladed rotor may be submerged in the plating bath, and an array of the consumable aluminum anodes may be positioned around the rotor blades to perform the below-described electroplating process.

Rotor blade piece 70 includes a rotor blade 72 and a platform 74 from which blade 72 extends. Rotor blade 72 includes, in turn, a blade root portion 76, a blade tip portion 78, a leading edge portion 80, and an opposing trailing edge portion 82. A base portion or shank 84 of rotor blade piece 70 is joined to platform 74 opposite rotor blade 72. Shank 84 is produced (e.g., cast and machined) to have an interlocking geometry, such as a fir tree or dovetail geometry. When rotor blade piece 70 is integrated into a larger rotor, shank 84 is inserted into mating slots provided around an outer circumferential portion of a separately-fabricated hub disk to prevent disengagement of piece 70 during high speed rotation of the rotor. Rotor blade 72 further includes a first face 86 (referred to hereafter "pressure side 86") and a second, opposing face 88 (hereafter "suction side 88"). As viewed from blade tip portion 78 toward blade root portion 76, rotor blade 72 is imparted with an airfoil-shaped geometry. Accordingly, pressure side 86 is imparted with a contoured, generally concave surface geometry, which bends or curves in three dimensions. Conversely, suction side 88 is imparted with a countered, generally convex surface geometry, which likewise bends or curves in multiple dimensions.

As indicated above, it may be desirable to form an aluminum-containing coating over pressure side 86, suction side 88, and possibly other selected surfaces of rotor blade piece 70 to reduce oxidation, corrosion, and material loss from rotor blade 72 during usage. Such aluminum-containing coatings may include aluminide coatings and MCrAlY coatings, which contain chromium, aluminum, yttrium, and "M" (representing nickel, cobalt, or a combination thereof). In other embodiments, the ionic liquid bath plating method may be utilized to deposit aluminum-containing layers over a turbomachine component for another purpose; e.g., to provide a bond coat for another coating, such as an yttria-stabilized zirconia coating. Formation of the aluminum-containing coating may entail deposition of an aluminum-containing layer over selected surfaces of rotor blade piece 70. Ionic liquid bath plating method 18 (FIG. 1) is well-suited for this purpose and may be performed as follows. First, during STEP 22 of plating method 18 (FIG. 1), one or more consumable aluminum anodes are obtained having surface geometries generally conforming to or matching the surface geometries of pressure side 86 and suction side 88. The consumable aluminum anodes are then positioned around rotor blade piece 70 during STEP 24 of plating method 18 (FIG. 1) such that the aluminum anodes substantially surround or enclose rotor blade 72.

Figure 5:
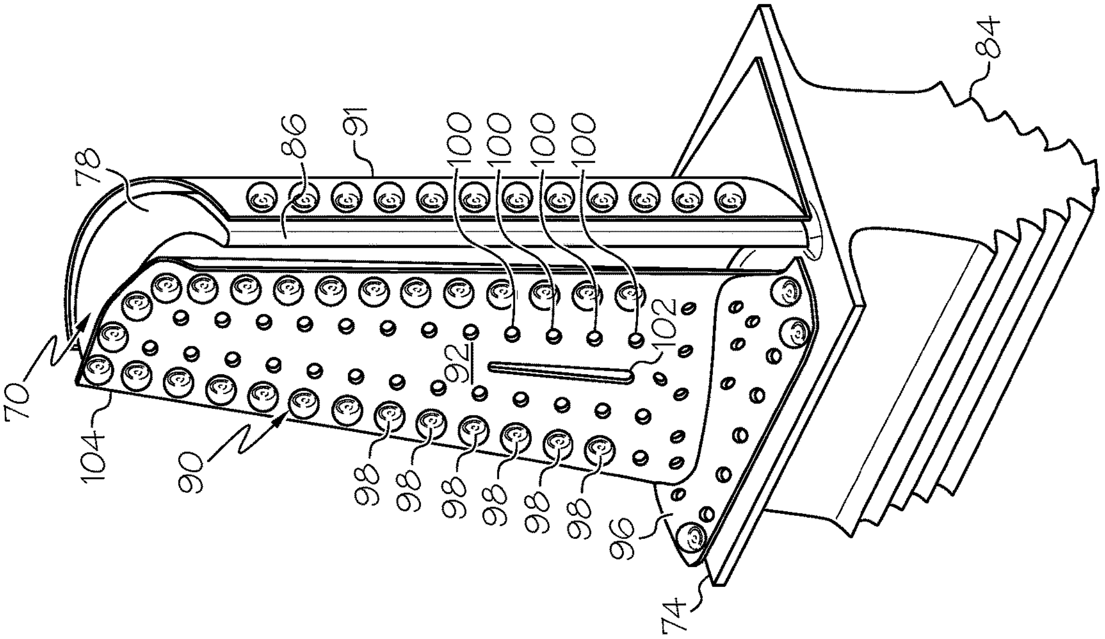
FIG. 5 is an isometric view of the rotor blade piece after positioning two shaped, consumable aluminum anodes adjacent the contoured blade surfaces of the blade piece in accordance with the plating method of FIG. 1.

FIG. 5 illustrates rotor blade piece 70 after positioning two consumable aluminum anodes 90, 91 adjacent pressure side 86 and suction side 88, respectively, in a non-contacting relationship. As can be seen, consumable aluminum anodes 90, 91 are positioned around and substantially surround rotor blade 72. Each consumable aluminum anode 90, 91 includes a shaped anode body 92 having interior or workpiece-facing anode surface. The workpiece-facing anode surface of anodes 90, 91 are imparted with three dimensional surface geometries following or generally conforming with the surface geometries of pressure side 86 and suction side 88 of rotor blade 72, respectively. As pressure side 86 and suction side 88 are each curved in multiple dimensions, workpiece-facing anode surfaces having geometries following multiple curved regions of these highly contoured or aerodynamically-streamlined surfaces of rotor blade 72. Additionally, each anode 90, 91 also includes a lower base or skirt 96 of aluminide anode 90 projects partially over platform 74 of rotor blade piece 70. Such features ensure that the aluminum-containing layer is further deposited over platform 74 in addition to rotor blade 72 during the electroplating process.

Consumable aluminum anodes 90, 91 are further produced to include a number of local anodic field modifying features. These features may include: (i) a number of dimples 98 (only a few of which are labeled to avoid cluttering the drawing), (ii) an array of perforations 100 (again only a few of which are labeled), (iii) a central slot 102, and (iv) an extended anode portion 104. Dimples 98 and extended anode portion 104 serve as anodic field focusing features, which concentrate the anodic field generated when consumable aluminum anode 90 and rotor blade piece 70 (or other metallic workpiece) are energized. A locally-thickened plating will thus be promoted along the regions of rotor blade piece 70 positioned adjacent dimples 98 and anode portion 104 during the electroplating process. Extended anode portion 104, in particular, projects beyond the edge of blade tip portion 78 and/or beyond the leading edge portion 80 of rotor blade 72 (in a forward direction) to concentrate the anodic field along these regions of blade 72. Conversely, perforations 100 and slot 102 (collectively "openings 100, 102") serve as anodic field damping features, which decrease or diffuse the anodic field along regions and the plating thickness along the regions of pressure side 86 positioned openings 100, 102 when consumable aluminum anode 90 is positioned adjacent rotor blade piece 70. As a further benefit, openings 100, 102 can also help facilitate plating solution flow to and from the plated area.

Consumable aluminum anode 90, consumable aluminum anode 91, and rotor blade piece 70 are next submerged in an ionic liquid plating bath (STEP 26, FIG. 1). The ionic liquid plating bath may have any suitable formulation, including those formulations discussed above in conjunction with FIG. 3. Further description of ionic liquid bath formulations and process parameters suitable for usage in the deposition of aluminum-containing layer onto rotor blade piece 70 (and other superalloy-based turbomachine components) can be found in the following documents, each of which is incorporated by reference: U.S. application Ser. No. 13/396,759, entitled "METHODS FOR PRODUCING A HIGH TEMPERATURE OXIDATION," and filed Feb. 6, 2012; U.S. application Ser. No. 14/924,284, entitled "SURFACE MODIFIERS FOR IONIC LIQUID ALUMINUM ELECTROPLATING SOLUTIONS, PROCESSES FOR ELECTROPLATING ALUMINUM THEREFROM, AND METHODS FOR PRODUCING AN ALUMINUM COATING USING THE SAME," and filed Feb. 17, 2015; and U.S. Pat. No. 8,7108,194, entitled "METHODS FOR PRODUCING A HIGH TEMPERATURE OXIDATION RESISTANT COATING ON SUPERALLOY SUBSTRATES AND THE COATED SUPERALLOY SUBSTRATES THEREBY PRODUCED," and issued Jul. 15, 2014.

Turning lastly to STEP 28 of ionic liquid bath plating method 18 (FIG. 1), electroplating is carried-out by applying potential across consumable aluminum anodes 90, 91 and rotor blade piece 70. Anodes 90, 91 may be electrically connected to a common positive terminal of a power source, while rotor blade piece 70 is connected to a negative terminal of the power source. As was previously the case, process parameters are controlled during the plating process to deposit the aluminum-containing layer onto the targeted surfaces of rotor blade piece 70 to the desired thicknesses. Ionic liquid bath plating is advantageously carried-out at relatively low temperatures to avoid undesired or uncontrolled diffusion of aluminum into rotor blade piece 70. After aluminum-containing layers have been fully deposited over pressure side 86, suction side 88, and platform 74, rotor blade piece 70 is removed from the ionic liquid plating bath and method 18 concludes. Additional processing steps may then be performed to complete fabrication of the high temperature, aluminum-containing coating, as needed. For example, one or more diffusion steps may subsequently be performed to diffuse the aluminum into the parent material of rotor blade piece 70 and form aluminides therewith. Finally, rotor blade piece 70 may be attached to a hub disk (not shown) along with a number of like rotor blade pieces, and the resulting assembly may then be further processed to complete fabrication of the inserted blade rotor.

Figure 7:
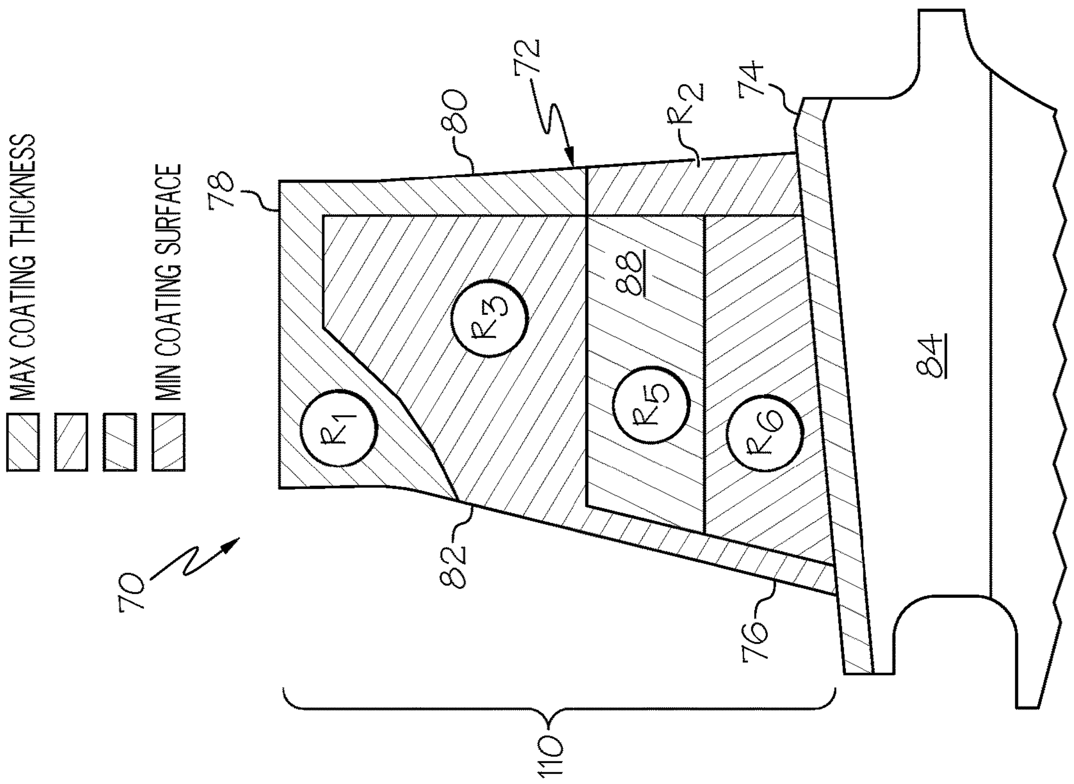
FIGS. 6 and 7 are meridional or flattened views of the rotor blade piece shown in FIGS. 4 and 5 after deposition of an aluminum-containing layer and conversion of the layer into an aluminum-containing (e.g., aluminide) coating having a regionally-varied thickness distribution.
Figure 6:
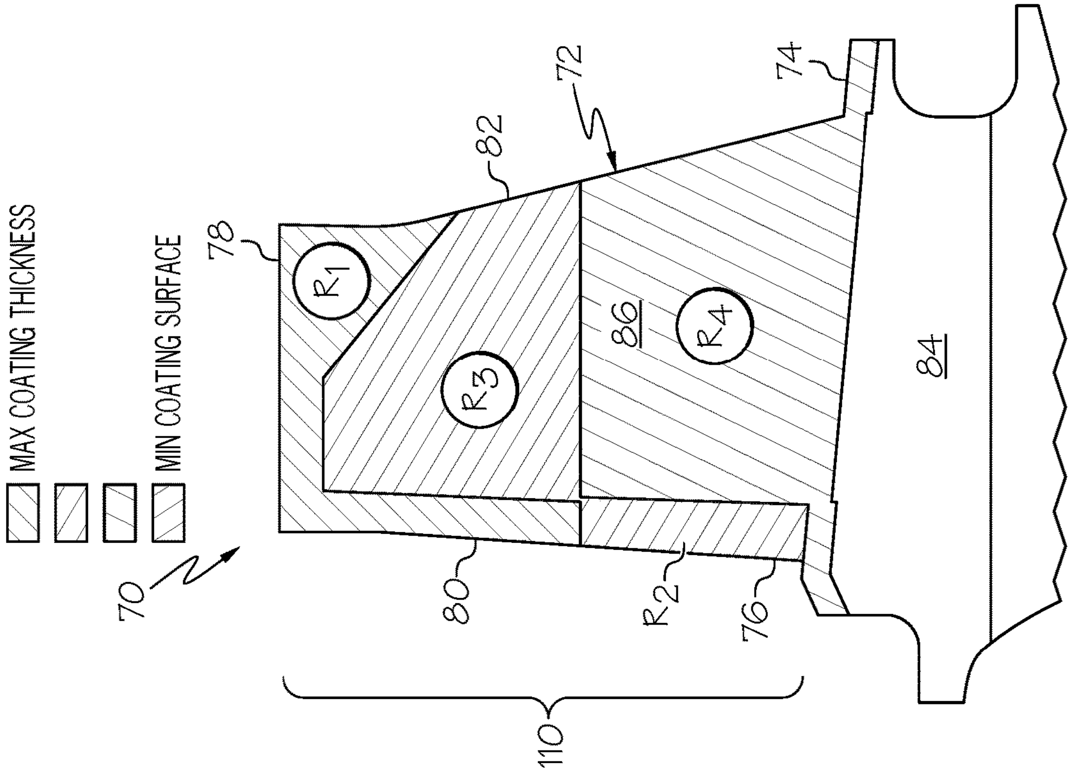

FIGS. 6 and 7 are flattened or meridional views of pressure side 86 and suction side 88 of rotor blade piece 70, respectively, after formation of a high temperature aluminum-containing coating 110 thereover. In one embodiment, and by way of non-limiting example only, aluminum-containing coating 110 is an aluminide coating, which is produced by diffusing the previously-deposited aluminum-containing layer into the body of rotor blade piece 70. Aluminum-containing coating 110 includes multiple regions of varying thicknesses, as represented by different cross-hatching patterns. Each region of aluminum-containing coating 110 having a thickness that differs as compared to the average coating thickness ($T_{AVG}$) is referred to below as a "thickness-modified region." In total, aluminum-containing coating 110 includes the six regions of varying thickness, as labeled by circular markers $R_1$-$R_6$. Aluminum-containing coating 110 may be imparted with such a varied thickness by first depositing an aluminum-containing layer to have regionally-varied thickness profile, as previously described, and subsequently diffusing the aluminum-containing layer into the body of rotor blade piece 70.

In the exemplary embodiment, aluminum-containing coating 110 is produced to include a locally-thickened region (region $R_1$), which largely overlies or covers areas of rotor blade 72 that have been identified (e.g., through field observation and/or bench testing) as prone to recession or material loss when rotor blade 70 is placed within its operative environment. Region R1 has a maximum thickness ($T_{MAX}$) and extends along blade tip portion 78 of rotor blade 72 in fore and aft directions. Additionally, region $R_1$ further extends downward along leading edge portion 80 of rotor blade 72 toward, but terminates prior to reaching platform 74. Aluminum-containing coating 110 also includes a locally-thinned region (region $R_6$), which overlies or covers an area of rotor blade 72 less prone to oxidation and corrosion, but subject to greater mechanical loading. Thus, to avoid embrittlement potentially caused by deposition of excessive amounts of aluminum, region $R_6$ is provided with a minimum coating thickness ($T_{MIN}$) and is deposited exclusively over suction side 88 and blade root portion 76 at a region adjacent the interface between blade root portion 76 of rotor blade 72 and platform 74. Aluminum-containing coating 110 further includes other regions (region $R_2$-$R_5$), which having varying intermediate thicknesses less than $T_{MAX}$ and greater than $T_{MIN}$. For example, coating 110 further includes an intermediate region $R_2$, which extends along leading edge portion 80 of rotor blade 72 between region $R_1$ to platform 74, wrapping around blade 72 from pressure side 86 to suction side 88 of blade 72. The respective thicknesses of the other regions of aluminum-containing coating are likewise tailored to best suit the operating conditions (e.g., in-service temperatures), material loss characteristics, and failure modes encountered within the service environment of rotor blade 72. The operational lifespan of rotor blade piece 70 is improved as a result.

There has thus been provided ionic liquid bath aluminum plating methods suitable for depositing aluminum-containing layers onto workpiece surfaces having three dimensionally-complex or contoured geometries. Additionally or alternatively, the ionic liquid bath plating methods can be utilized to deposit aluminum-containing layers having three dimensionally-tailored thickness distributions. In the latter regard, the above-described ionic liquid bath plating methods can be utilized to deposit aluminum-containing layers having non-uniform layer thicknesses, which vary in accordance with a pre-established coating thickness layout or map. For these reasons, the ionic liquid bath plating method may be well-suited for performance as part of a high temperature coating fabrication process, which is utilized to create an aluminum-containing coating over an aerodynamically-streamlined turbomachine component. The consumable aluminum anodes utilized during the ionic liquid bath plating method can be produced in various different manners. Such methods include, but are not limited to, casting, three dimensional printing, DMLS, machining (e.g., milling) of an aluminum block or preform, and metalworking (e.g., metal sheet stamping) processes. In one implementation, a number of consumable aluminum anodes are produced by processing an aluminum sheet. An example of such a process is shown in FIG. 8-11 and described below.

Figure 8:
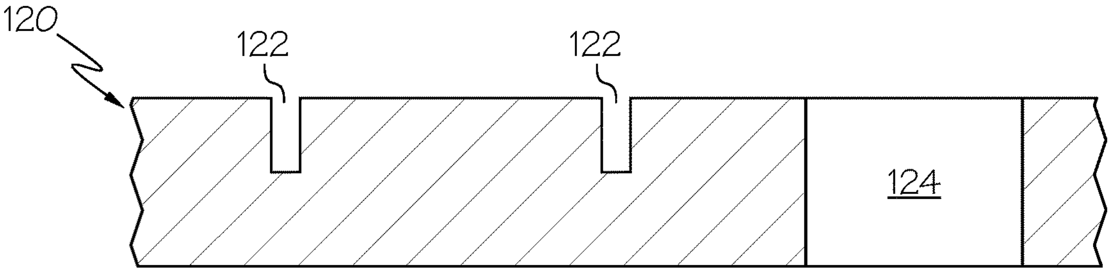
FIGS. 8-11 illustrate exemplary process steps that can be performed to produce a number of consumable aluminum anodes suitable for usage during performance of the plating method of FIG. 1.

With initial reference to FIG. 8, an aluminum plate or sheet 120 from which a relatively large number of consumable aluminum anodes is produced. Non-penetrating openings or grooves 122 are created at selected locations across aluminum sheet 120 by, for example, photoetching. Grooves 122 are created to facilitate the subsequently-performed stamping operation used to create raised or depressed features, such as dimples, within sheet 120. Prior to, after, or concurrent with the formation of grooves 120, gully penetrating openings 124 may also be cut through selected locations of sheet 120. Any suitable material removal process may be utilized for this purpose including photoetching, laser cutting, EDM wire cutting process, water jetting, and punching processes, to list but a few examples. Openings 124 may serve as anodic field damping features and/or ports for improved flow of the plating bath solution to the workpiece surfaces to be plated, as previously described above in conjunction with FIGS. 2, 3, and 5.

Figure 9:
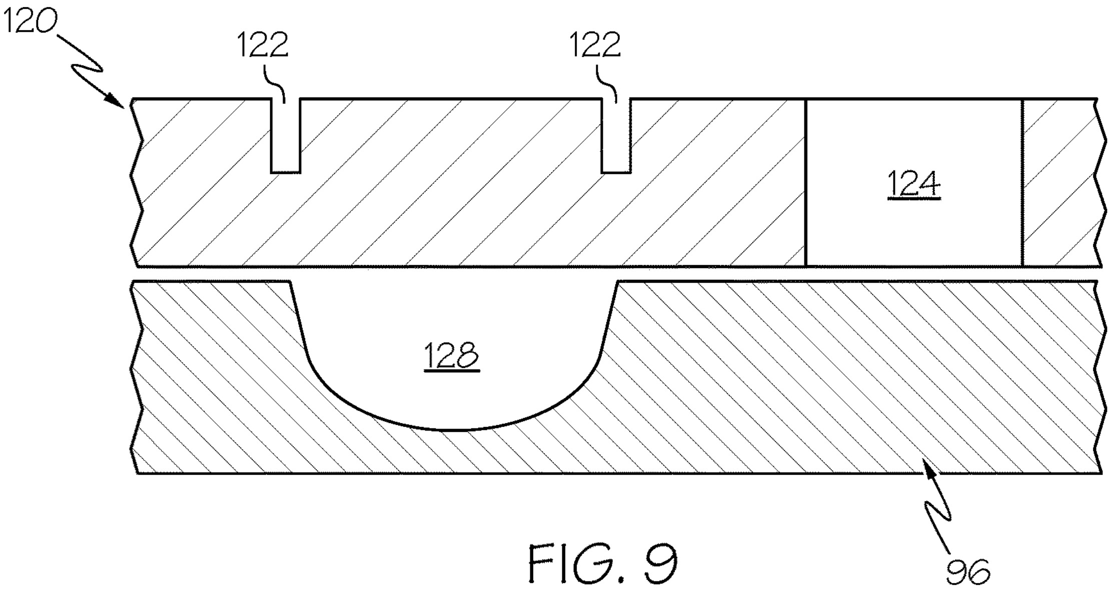
Figure 10:
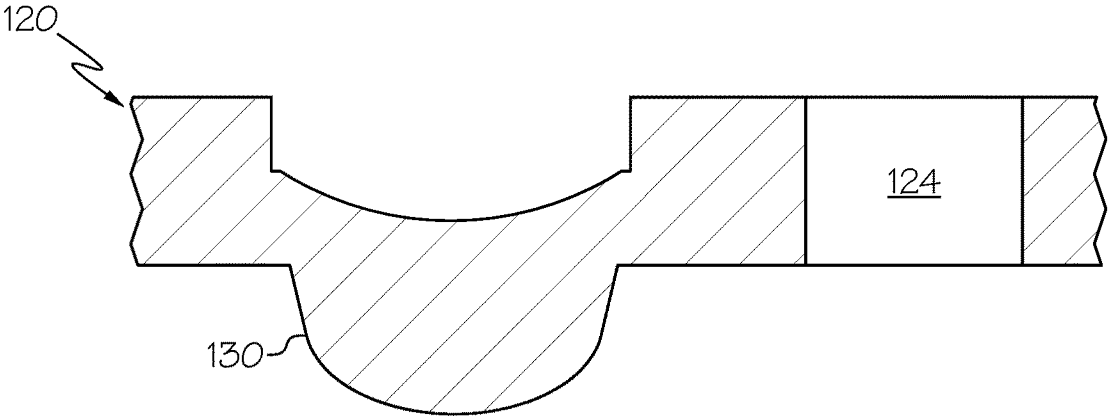
Figure 11:
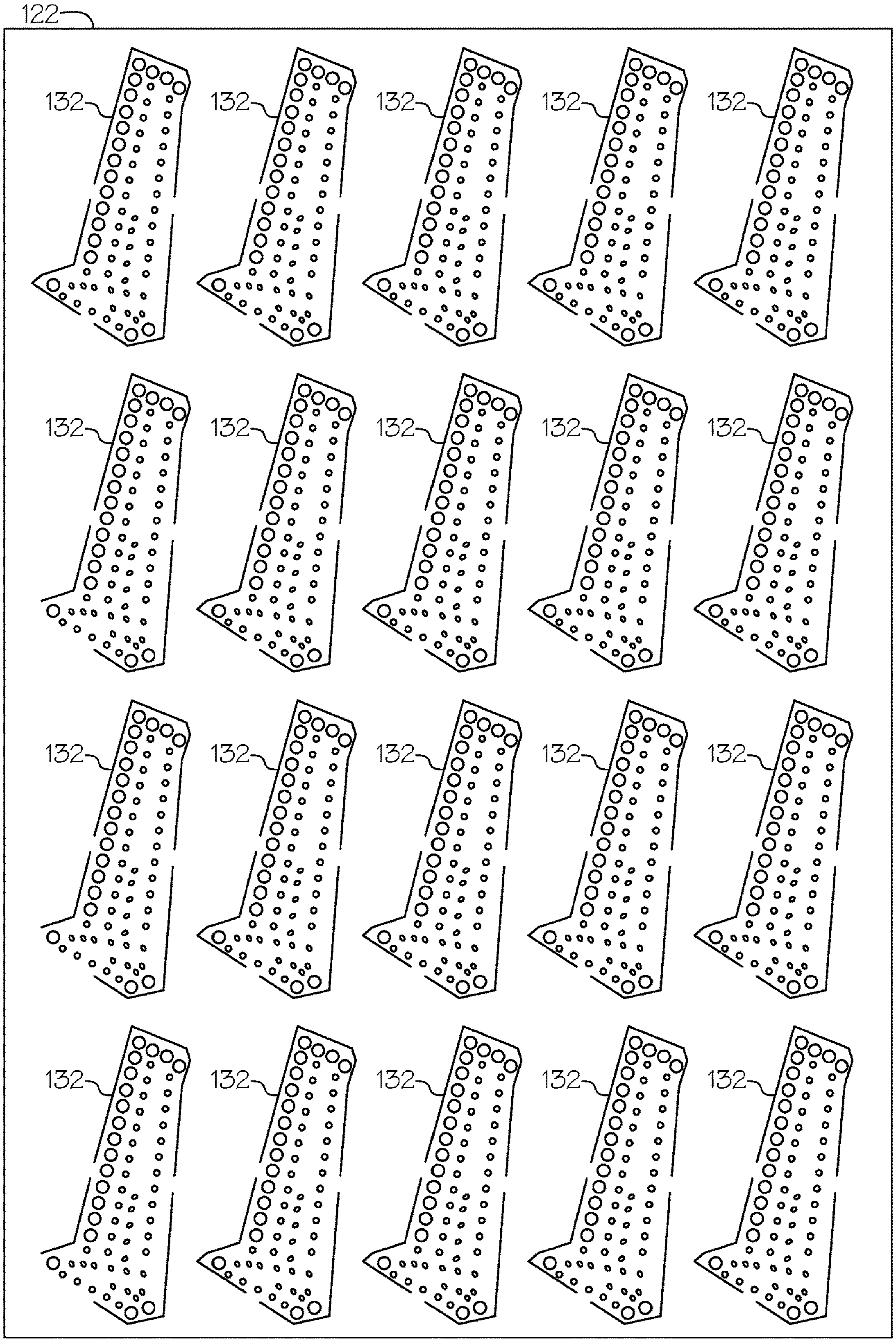

Aluminum sheet 120 is next transferred to a first die 126 having a number of cavities 128 (one of which is shown in FIG. 9) for a stamping or "dimpling" operation. During the dimpling operation, aluminum sheet 120 is forced against die 126 (e.g., utilizing a hydraulic press) to form raised features or dimples 130 (identified in FIG. 10) at the desired locations across the body of sheet 120. Again, dimples 130 may be formed at locations corresponding to the previously-formed grooves 122. Such operations are performed across the entirety of aluminum sheet 120 such that multiple consumable aluminum electrode blanks or preforms 132 are formed, as shown more clearly in FIG. 11. The appropriate regions of aluminum sheet 120 are then imparted with the desired three dimensionally-contoured shapes utilizing a second die (not shown). Stated differently, aluminum sheet 120 is then pressed into the second die to transfer the contoured shape of the die cavities to different regions of sheet 120 corresponding to the aluminum anodes. Finally, sheet 120 is singulated (e.g., by laser cutting or water jetting) to yield a plurality of consumable aluminum electrodes, such as consumable aluminum anodes 90, 91 shown in FIG. 5. In further embodiments, the steps performed to produce a number of consumable aluminum anodes in parallel from an aluminum sheet may vary. For example, in certain embodiments, a single stamping or punching operation may be performed to impart the consumable aluminum anodes with their desired shape, to sheer the anode bodies from the remainder of the sheet, and/or to produce any desired anodic field modifying feature (if present) across the bodies of the aluminum anodes.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A method, comprising:

providing a workpiece with a workpiece surface having a non-planar geometry;

generating a virtual thickness distribution map that includes a desired thickness distribution of an aluminum-containing layer to be formed on the workpiece surface;

utilizing modeling software to predetermine positioning, dimensions, and geometries of local anodic field modifying features configured to achieve the desired thickness distribution as a function of the virtual thickness distribution map and the non-planar geometry of the workpiece surface;

obtaining a die including a die cavity having a contoured shape conformal with the non-planar geometry of the workpiece surface; and producing a shaped consumable aluminum anode from an aluminum sheet, wherein the shaped consumable aluminum anode is configured to produce the aluminum-containing layer on the workpiece surface during an ionic liquid bath plating process such that that the aluminum-containing layer has the thickness distribution in accordance with the virtual thickness distribution map, wherein producing the shaped consumable aluminum anode includes:

pressing the aluminum sheet into the die to transfer the contoured shape of the die cavity to the aluminum sheet to produce a workpiece-facing anode surface conformal with at least a portion of the non-planar geometry of the workpiece surface; and forming the local anodic field modifying features on the workpiece-facing anode surface having the predetermined positioning, dimensions, and geometries, wherein the local anodic field modifying features are configured to be positioned adjacent targeted regions of the workpiece surface when the workpiece-facing anode surface and the workpiece surface are placed in an adjacent, non-contacting relationship during the ionic liquid bath plating process, and alter an anodic field at the targeted regions during the ionic liquid bath plating process to achieve the thickness distribution.

2. The method of claim 1, wherein the shaped consumable aluminum anode is configured to deposit, via the ionic liquid bath plating process, the aluminum-containing layer to have an average thickness ($T_{AVG}$), wherein the local anodic field modifying features are configured to modify the thickness the aluminum-containing layer at the targeted regions to have a modified thickness ($T_{MOD}$) different than the average thickness ($T_{AVG}$).

3. The method of claim 2, wherein the modified thickness ($T_{MOD}$) is less than the average thickness ($T_{AVG}$), and the local anodic field modifying features comprise at least one opening formed through the shaped consumable aluminum anode.

4. The method of claim 3, wherein the at least one opening comprises a plurality of openings formed in a perforated region of the shaped consumable aluminum anode.

5. The method of claim 2, wherein the modified thickness ($T_{MOD}$) is greater than the average thickness ($T_{AVG}$), wherein the shaped consumable aluminum anode comprises an anode body, and wherein the local anodic field modifying features comprise at least one raised feature projecting from the anode body toward the workpiece surface when positioned adjacent the workpiece-facing anode surface.

6. The method of claim 5, wherein the at least one raised feature comprises a plurality of dimples stamped into the anode body.

7. The method of claim 1, wherein the workpiece surface is a portion of a turbomachine component having a contoured surface, and wherein the workpiece-facing anode surface conforms with a surface geometry of the contoured surface.

8. The method of claim 7, wherein the turbomachine component comprises a rotor blade having a pressure side and an opposing suction side, wherein the workpiece-facing anode surfaces are conformal with the pressure side of the rotor blade or the suction side of the rotor blade.

* * * * *